US011378735B1

(12) United States Patent
Takahashi et al.

(10) Patent No.: US 11,378,735 B1
(45) Date of Patent: Jul. 5, 2022

(54) MULTI-CORE FIBER

(71) Applicant: FURUKAWA ELECTRIC CO., LTD., Tokyo (JP)

(72) Inventors: Masanori Takahashi, Tokyo (JP); Ryuichi Sugizaki, Tokyo (JP); Masayoshi Tsukamoto, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/192,994

(22) Filed: Mar. 5, 2021

(51) Int. Cl.
*G02B 6/02* (2006.01)
*G02B 6/036* (2006.01)

(52) U.S. Cl.
CPC ..... *G02B 6/02042* (2013.01); *G02B 6/02004* (2013.01); *G02B 6/02395* (2013.01); *G02B 6/03616* (2013.01)

(58) Field of Classification Search
CPC ............ G02B 6/02004; G02B 6/02042; G02B 6/02395; G02B 6/03616
See application file for complete search history.

(56) References Cited

U.S. PATENT DOCUMENTS

| 6,154,594 | A | 11/2000 | Fiacco et al. |
| 7,787,732 | B2 | 8/2010 | Sugizaki et al. |
| 9,081,129 | B2 * | 7/2015 | Matsuo ................ G02B 6/0365 |
| 2013/0183016 | A1 * | 7/2013 | Imamura ............ G02B 6/02042 385/127 |

FOREIGN PATENT DOCUMENTS

| JP | 2007-33466 A | 2/2007 | |
| JP | 2008-58662 A | 3/2008 | |
| JP | 2013-33865 A | 2/2013 | |
| JP | 2020201360 A | * 12/2020 | ............... G02B 6/02 |
| WO | WO 2013/051655 A | 4/2013 | |
| WO | WO-2015133407 A1 | * 9/2015 | ......... G02B 6/02219 |
| WO | WO-2021015186 A1 | * 1/2021 | ............. G02B 6/036 |

OTHER PUBLICATIONS

Japanese Office Action dated Nov. 9, 2021 in Japanese Patent Application No. 2019-107429 (with unedited computer generated English translation), 6 pages.
Office Action dated Apr. 5, 2022 in Japanese Patent Application No. 2019-107429, along with an English translation.

* cited by examiner

*Primary Examiner* — Daniel Petkovsek
(74) *Attorney, Agent, or Firm* — Oblon, McClelland, Maier & Neustadt, L.L.P.

(57) ABSTRACT

A multi-core fiber includes: plural cores made of silica-based glass; and a cladding enclosing the plural cores and made of silica-based glass, the cladding having a refractive index lower than a maximum refractive index of the plural cores. Further, the multi-core fiber has a mode field diameter of 5.0 µm or larger at a wavelength of 1100 nm, the multi-core fiber provides single-mode propagation at the wavelength of 1100 nm, the multi-core fiber has a bending loss of 1 dB/turn or less at the wavelength of 1100 nm when the multi-core fiber is bent at a radius of 2 mm, and the multi-core fiber has a crosstalk between cores of −30 dB/km or less.

9 Claims, 4 Drawing Sheets

MULTI-CORE FIBER

BACKGROUND

The present application relates to multi-core fibers.

Japanese Laid-open Patent Publication No. 2008-58662 discloses a single-core fiber (SCF) capable of providing single mode propagation of light having a wavelength of 1100 nm.

Furthermore, International Publication Pamphlet No. WO 2008/026737 discloses a technique for forming an optical fiber into a ribbon, for the purpose of space saving storage of the optical fiber in a device, the optical fiber having been decreased in diameter.

Various types of optical fibers have been developed to be adapted to the recent increasing volume of communication, and multi-core fibers (MCFs) are receiving a lot of attention among them.

SUMMARY

According to an embodiment, A multi-core fiber includes: plural cores made of silica-based glass; and a cladding enclosing the plural cores and made of silica-based glass, the cladding having a refractive index lower than a maximum refractive index of the plural cores. Further, the multi-core fiber has a mode field diameter of 5.0 μm or larger at a wavelength of 1100 nm, the multi-core fiber provides single-mode propagation at the wavelength of 1100 nm, the multi-core fiber has a bending loss of 1 dB/turn or less at the wavelength of 1100 nm when the multi-core fiber is bent at a radius of 2 mm, and the multi-core fiber has a crosstalk between cores of −30 dB/km or less.

DETAILED DESCRIPTION

An embodiment of the present application will be described in detail below, together with the drawings. The present application is not limited by this embodiment. Furthermore, the same reference sign will be assigned to elements that are the same or corresponding to each other, as appropriate, throughout the drawings. It also needs to be noted that the drawings are schematic, and relations among dimensions of elements and ratios among the elements, for example, may be different from the actual ones. A portion having different dimensional relations and ratios among the drawings may be included, too. In addition, in this specification, a cutoff wavelength means a cable cutoff wavelength that is an effective cutoff wavelength and defined by International Telecommunication Union (ITU-T) G.650.1. Any other term that is not particularly defined in this specification conforms to the definition or measurement method according to G.650.1 and G.650.2.

EMBODIMENTS

Figure 1:
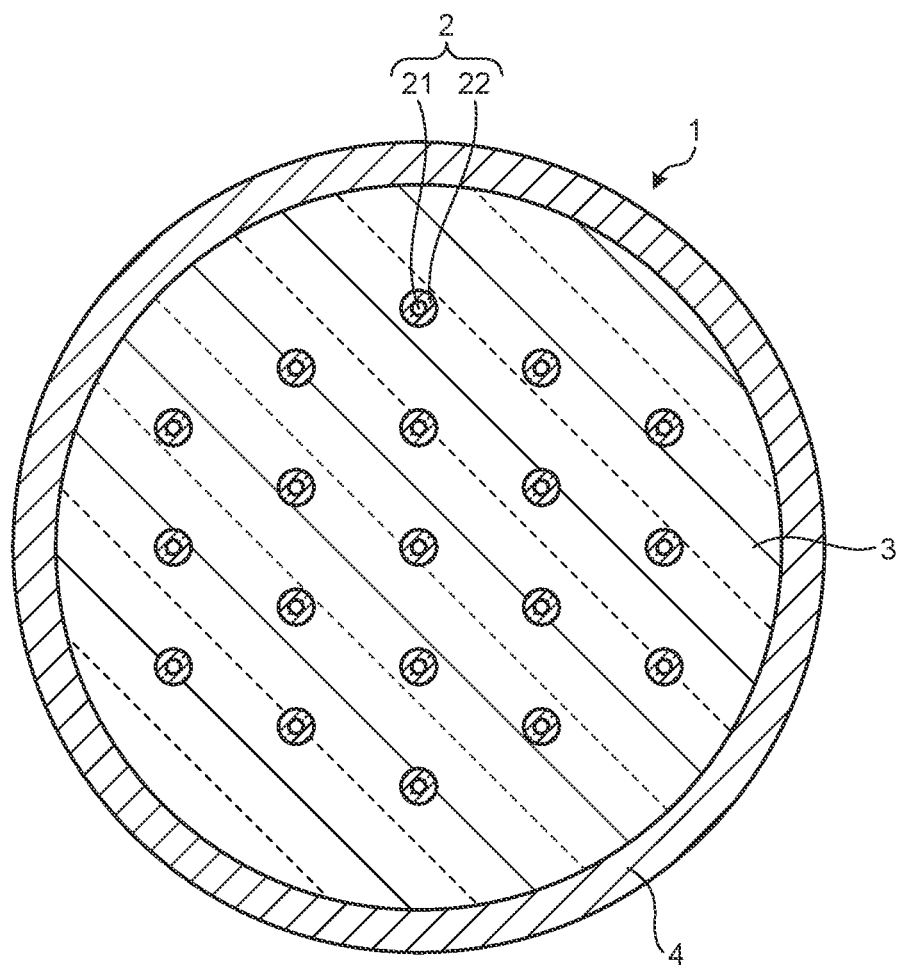
FIG. 1 is a schematic diagram illustrating a multi-core fiber according to an embodiment.
Figure 2:
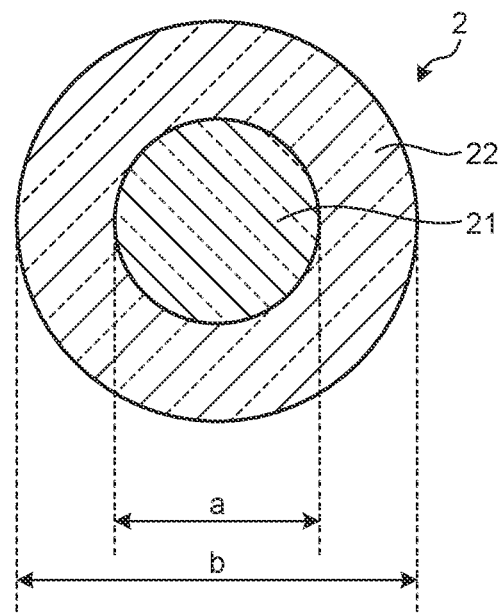
FIG. 2 is a schematic diagram illustrating an example of a core.

FIG. 1 is a schematic diagram illustrating a multi-core fiber according to an embodiment. FIG. 2 is a schematic diagram illustrating an example of a core.

As illustrated in FIG. 1, a multi-core fiber 1 includes: plural cores 2 made of silica-based glass; a cladding 3 enclosing the plural cores 2 and made of silica-based glass having a refractive index lower than the maximum refractive index of the plural cores 2; and coating 4 that covers the outer periphery of the cladding 3. This multi-core fiber 1 has, in the cladding 3 having the outer periphery covered by the coating 4, a structure having a total of nineteen cores 2 arranged in a hexagonal close-packed structure.

Each core 2 is formed of silica-based glass having a dopant added therein, the dopant being for adjusting the core 2's refractive index and being, for example, germanium or fluorine. As illustrated in FIG. 2, each core 2 has a first core 21 and a second core 22 surrounding the outer periphery of the first core 21. The first core 21 is a core in a first layer doped with a dopant that increases the first core 21's refractive index, such as germanium. The second core 22 is a core in a second layer that is a depressed layer doped with a dopant that decreases the second core 22's refractive index, such as fluorine. In this embodiment, all of the nineteen cores 2 are designed to have the same refractive index.

The cladding 3 is designed to have a refractive index lower than the maximum refractive index of the first core 21 and higher than the refractive index of the second core 22, and has the plural cores 2 in the cladding 3. This cladding 3 is formed of, for example, pure silica glass not doped with a dopant for adjusting the cladding 3's refractive index.

The coating 4 has a function of protecting glass in the multi-core fiber 1. The coating 4 is made of, for example, a UV curable resin, and has a layered structure with one layer or two or more layers. Examples of the UV curing resin used as the coating 4 include urethane acrylates, polybutadiene acrylates, epoxy acrylates, silicone acrylates, and polyester acrylates, but are not particularly limited as long as they are used in coating optical fibers.

Figure 3:
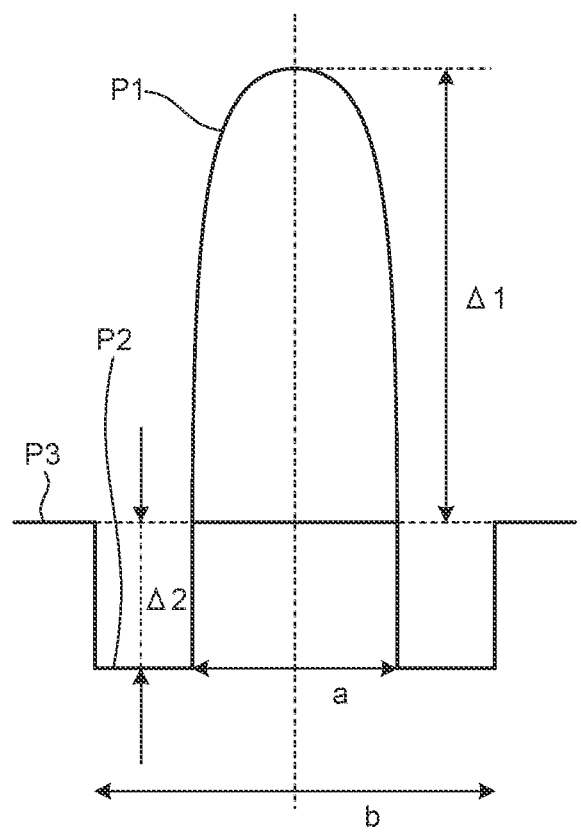
FIG. 3 is a diagram illustrating a W-type refractive index profile of a core used in simulation for characteristics of a multi-core fiber.

FIG. 3 is a diagram illustrating a W-type refractive index profile of a core used in simulation for characteristics of a multi-core fiber. As illustrated in FIG. 3, the multi-core fiber 1 has a W-type refractive index profile including: a refractive index profile P1 of the first core 21; a refractive index profile P2 of the second core 22; and a refractive index profile of the cladding 3.

Furthermore, FIG. 3 illustrates a diameter a of the first core 21, a diameter b of the second core 22, a relative refractive-index difference Δ1 of the first core 21, relative to the cladding 3, and a relative refractive-index difference Δ2 of the second core 22, relative to the cladding 3.

The relative refractive-index differences Δ1 and Δ2 are respectively expressed by Equations (1) and (2) below.

$$\Delta 1 = \{(n_{c1} - n_c)/n_{c1}\} \cdot 100 \quad (1)$$

$$\Delta 2 = \{(n_{c2} - n_c)/n_{c2}\} \cdot 100 \quad (2)$$

In these equations, $n_{c1}$ is the maximum refractive index of the first core 21, $n_{c2}$ is the minimum refractive index of the second core 22, and $n_c$ is the refractive index of the cladding 3.

Simulations for characteristics were performed by changing parameter values of the multi-core fiber 1 having the W-type refractive index profile as illustrated in FIG. 3. Results of these simulations are listed in Table 1.

Table 1 is a list of characteristics for when parameters are set for the multi-core fiber 1 including the cores 2 having the refractive index profile illustrated in FIG. 3. Among the parameters listed in Table 1, an MDF refers to the mode field diameter at a wavelength of 1100 nm, cutoff wavelength is the cutoff wavelength described above, and bending loss is the bending loss at the wavelength of 1100 nm in bending at a radius of 2 mm.

minimum cladding thickness is an important parameter for favorably maintaining the optical characteristics of outer peripheral cores near the interface between the cladding 3 and the coating 4. For example, if the cores 2 are too close to the coating 4, light propagating through the cores 2 leaks to the coating 4 and loss in the outer peripheral cores is increased. Therefore, the minimum cladding thickness needs to be designed to be at a size enabling this loss to be reduced.

TABLE 1

| | Δ1 [%] | Δ2 [%] | a [μm] | b [μm] | MDF [μm] (1100 nm) | Cutoff wavelength [nm] | Bending loss [dB/turn] (1100 nm) | Core pitch [μm] | Minimum cladding thickness [μm] | Cross-talk between cores [dB/km] | Cladding diameter [μm] |
|---|---|---|---|---|---|---|---|---|---|---|---|
| Calculation Example S1  | 0.55 | −0.4  | 7.3 | 14.0 | 6.1 | 1171 | 0.7 | 25 | 8.6  | −40.6  | 117.1 |
| Calculation Example S2  | 0.55 | −0.4  | 7.3 | 14.0 | 6.1 | 1171 | 0.7 | 30 | 8.5  | −71.5  | 139.0 |
| Calculation Example S3  | 0.55 | −0.4  | 7.3 | 14.0 | 6.1 | 1171 | 0.7 | 35 | 15.6 | −102.3 | 171.2 |
| Calculation Example S4  | 0.55 | −0.4  | 7.3 | 14.0 | 6.1 | 1171 | 0.7 | 40 | 13.2 | −132.0 | 186.3 |
| Calculation Example S5  | 0.70 | −0.01 | 4.9 | 19.6 | 5.3 | 1078 | 0.9 | 25 | 18.7 | −33.1  | 137.5 |
| Calculation Example S6  | 0.70 | −0.01 | 4.9 | 19.6 | 5.3 | 1078 | 0.9 | 30 | 18.3 | −64.5  | 156.5 |
| Calculation Example S7  | 0.70 | −0.01 | 4.9 | 19.6 | 5.3 | 1078 | 0.9 | 35 | 21.0 | −89.0  | 181.9 |
| Calculation Example S8  | 0.70 | −0.01 | 4.9 | 19.6 | 5.3 | 1078 | 0.9 | 40 | 14.2 | −95.8  | 188.4 |
| Calculation Example S9  | 0.65 | −0.02 | 5.3 | 13.1 | 5.6 | 1098 | 0.8 | 25 | 18.8 | −30.9  | 137.6 |
| Calculation Example S10 | 0.65 | −0.02 | 5.3 | 13.1 | 5.6 | 1098 | 0.8 | 30 | 17.8 | −62.2  | 155.7 |
| Calculation Example S11 | 0.65 | −0.02 | 5.3 | 13.1 | 5.6 | 1098 | 0.8 | 35 | 17.7 | −93.4  | 175.5 |
| Calculation Example S12 | 0.60 | −0.4  | 6.5 | 13.0 | 5.6 | 1093 | 0.8 | 25 | 17.5 | −43.5  | 135.0 |
| Calculation Example S13 | 0.60 | −0.4  | 6.5 | 13.0 | 5.6 | 1093 | 0.8 | 30 | 17.8 | −74.7  | 155.6 |
| Calculation Example S14 | 0.60 | −0.4  | 6.5 | 13.0 | 5.6 | 1093 | 0.8 | 35 | 18.8 | −105.6 | 177.6 |
| Calculation Example S15 | 0.60 | −0.4  | 6.5 | 13.0 | 5.6 | 1093 | 0.8 | 40 | 18.3 | −132.5 | 196.6 |

In these simulations, core design parameters including the relative refractive-index difference Δ1 of the first core 21, the relative refractive-index difference Δ2 of the second core 22, the diameter a of the first core 21, the diameter b of the second core 22, the mode field diameter at the wavelength of 1100 nm, the cutoff wavelength, and the bending loss at the wavelength of 1100 nm were set, and according to these set values, parameters related to characteristics of the multi-core fiber 1 were calculated. Examples of the parameters related to the characteristics of the multi-core fiber 1 include the core pitch, the minimum cladding thickness, the cross-talk between cores (XT) and the outer diameter of the cladding 3 (the cladding diameter).

The core pitch is an interval between core centers of the nearest neighboring cores 2. As to the number of cores and the arrangement of cores, the core pitch is desirably small for increased core density in the fiber's cross-sectional area, but if the crosstalk between cores is desired to be reduced, the core pitch needs to have a certain size. Since the cores 2 are arranged at equal intervals in the multi-core fiber 1, the core pitches have the same value.

The minimum cladding thickness is a parameter expressed by the minimum distance (a radial length) from the center of the core 2 positioned outermost among the plural cores 2 (the center of the outermost core) to an interface between the cladding 3 and the coating 4. The The crosstalk between cores is a parameter that is able to be reduced by increasing the interval between cores. Decreasing the interval between cores may cause leakage of light between the cores (crosstalk between the cores) and degradation of the transmission quality. Therefore, the crosstalk between cores is desirably reduced.

The cladding diameter needs to be increased when the plural cores 2 are to be arranged more inward in the cladding 3. However, while enabling the transmission capacity per fiber to be increased, increasing the cladding diameter reduces the mechanical reliability. As to the mechanical reliability, the larger the cladding diameter is, the larger the strain applied to the silica-based glass when the multi-core fiber 1 is bent becomes and the higher the breakage probability thus becomes. Therefore, the cladding diameter is preferably reduced to a size that achieves the mechanical reliability required.

As listed in Table 1, for Calculation Examples S1 to S4, simulation calculation was performed with their core designs set at the same values and their core pitches set at different values. Calculation Examples S5 to S15 are calculation examples having their core designs changed to values different from those of Calculation Examples S1 to S4. For Calculation Examples S5 to S8, simulation calculation was performed with their core designs set at the same values and their core pitches set at different values. For Calculation Examples S9 to S11, simulation calculation was performed with their core designs set at the same values and their core pitches set at different values. For Calculation Examples S12 to S15, simulation calculation was performed with their core designs set at the same values and their core pitches set at different values.

Specifically, firstly, in Calculation Examples S1 to S4, the minimum cladding thicknesses, the crosstalks between cores, and the cladding diameters were calculated for when: the core designs were set such that the relative refractive-index difference Δ1 of the first core 21, relative to the cladding 3, was 0.55%, the relative refractive-index difference Δ2 of the second core 22, relative to the cladding 3, was −0.4%, the diameter a of the first core 21 was 7.3 μm, the diameter b of the second core 22 was 14.0 μm, the mode field diameter at the wavelength of 1100 nm was 6.1 μm, the cutoff wavelength was 1171 nm, and the bending loss at the wavelength of 1100 nm was 0.7 dB/turn; and the core pitches were 25 μm, 30 μm, 35 μm, and 40 μm.

In Calculation Example S1, when the core pitch is 25 μm, the minimum cladding thickness is calculated to be 8.6 μm. As to a method of calculating the minimum cladding thickness, when loss caused by leakage of light outside the cladding 3 from the core 2 is assumed to be excessive loss, this excessive loss increases as the cladding thickness is decreased, and conversely decreases as the cladding thickness is increased. The cladding thickness when this excessive loss becomes 0.001 dB/km is calculated as the minimum cladding thickness. Furthermore, when the core pitch is 25 μm, the crosstalk between cores is calculated to be −40.6 dB/km. The cladding diameter is then found from the minimum cladding thickness and the crosstalk between cores. For example, when the number of cores is nineteen and the core arrangement is in a hexagonal close-packed structure, the radius of the cladding 3 results from addition of two times the core pitch and the minimum cladding thickness together, and the cladding diameter (the diameter of the cladding 3) is thus able to be found from that radius.

In Calculation Example S1, the minimum cladding thickness is 8.6 μm and the cladding diameter is 117.1 μm. That is, the results in Calculation Example S1 indicate that the cladding thickness is able to be made larger than the minimum cladding thickness of 8.6 μm and the outer diameter of the cladding 3 is able to be made 124 μm to 126 μm. The cladding diameter of the multi-core fiber 1 may be, for example, 124 μm to 126 μm by being designed to have a cladding diameter of 125 μm, in consideration of a tolerance of 1 μm. That is, the cladding diameter of the multi-core fiber 1 is able to be formed equivalently to that of an optical fiber conforming to G.650.2.

Similarly to Calculation Example S1, the minimum cladding thicknesses, the crosstalks between cores, and the cladding diameters are calculated for when the core pitch is 30 μm in Calculation Example S2, the core pitch is 35 μm in Calculation Example S3, and the core pitch is 40 μm in Calculation Example S4. In Calculation Example S2, the minimum cladding thickness is 8.5 μm, the crosstalk between cores is −71.5 dB/km, and the cladding diameter is 139.0 μm. In Calculation Example S3, the minimum cladding thickness is 15.6 μm, the crosstalk between cores is −102.3 dB/km, and the cladding diameter is 171.2 μm. In Calculation Example S4, the minimum cladding thickness is 13.2 μm, the crosstalk between cores is −132.0 dB/km, and the cladding diameter is 186.3 μm. Accordingly, in Calculation Examples S1 to S4, all of the crosstalks between cores are −30 dB/km or less.

Next, in Calculation Examples S5 to S8, the minimum cladding thicknesses, the crosstalks between cores, and the cladding diameters were calculated for when: the core designs were set such that the relative refractive-index difference Δ1 of the first core 21, relative to the cladding 3, was 0.70%, the relative refractive-index difference Δ2 of the second core 22, relative to the cladding 3, was −0.01%, the diameter a of the first core 21 was 4.9 μm, the diameter b of the second core 22 was 19.6 μm, the mode field diameter at the wavelength of 1100 nm was 5.3 μm, the cutoff wavelength was 1078 nm, and the bending loss at the wavelength of 1100 nm was 0.9 dB/turn; and the core pitches were 25 μm, 30 μm, 35 μm, and 40 μm. In Calculation Example S5, the core pitch is 25 μm, in Calculation Example S6, the core pitch is 30 μm, in Calculation Example S7, the core pitch is 35 μm, and in Calculation Example S8, the core pitch is 40 μm.

In Calculation Example S5, the minimum cladding thickness is 18.7 μm, the crosstalk between cores is −33.1 dB/km, and the cladding diameter is 137.5 μm. In Calculation Example S6, the minimum cladding thickness is 18.3 μm, the crosstalk between cores is −64.5 dB/km, and the cladding diameter is 156.5 μm. In Calculation Example S7, the minimum cladding thickness is 21.0 μm, the crosstalk between cores is −89.0 dB/km, and the cladding diameter is 181.9 μm. In Calculation Example S8, the minimum cladding thickness is 14.2 μm, the crosstalk between cores is −95.8 dB/km, and the cladding diameter is 188.4 μm. Accordingly, in Calculation Examples S5 to S8, all of crosstalks between cores are −30 dB/km or less.

Next, in Calculation Examples S9 to S11, the minimum cladding thicknesses, the crosstalks between cores, and the cladding diameters were calculated for when: the core designs were set such that the relative refractive-index difference Δ1 of the first core 21, relative to the cladding 3, was 0.65%, the relative refractive-index difference Δ2 of the second core 22, relative to the cladding 3, was −0.02%, the diameter a of the first core 21 was 5.3 μm, the diameter b of the second core 22 was 13.1 μm, the mode field diameter at the wavelength of 1100 nm was 5.6 μm, the cutoff wavelength was 1098 nm, and the bending loss at the wavelength of 1100 nm was 0.8 dB/turn; and the core pitches were 25 μm, 30 μm, and 35 μm. In Calculation Example S9, the core pitch is 25 μm, in Calculation Example S10, the core pitch is 30 μm, and in Calculation Example S11, the core pitch is 35 μm.

In Calculation Example S9, the minimum cladding thickness is 18.8 μm, the crosstalk between cores is −30.9 dB/km, and the cladding diameter is 137.6 μm. In Calculation Example S10, the minimum cladding thickness is 17.8 μm, the crosstalk between cores is −62.2 dB/km, and the cladding diameter is 155.7 μm. In Calculation Examples S11, the minimum cladding thickness is 17.7 μm, the crosstalk between cores is −93.4 dB/km, and the cladding diameter is 175.5 μm. Accordingly, in Calculation Examples S9 to S11, all of the crosstalks between cores are −30 dB/km or less.

Next, in Calculation Examples S12 to S15, the minimum cladding thicknesses, the crosstalks between cores, and the cladding diameters were calculated for when: the core designs were set such that the relative refractive-index difference Δ1 of the first core 21, relative to the cladding 3, was 0.60%, the relative refractive-index difference 62 of the second core 22, relative to the cladding 3, was −0.4%, the diameter a of the first core 21 was 6.5 μm, the diameter b of the second core 22 was 13.0 μm, the mode field diameter at the wavelength of 1100 nm was 5.6 μm, the cutoff wavelength was 1093 nm, and the bending loss at the wavelength of 1100 nm was 0.8 dB/turn; and the core pitches were 25 µm, 30 µm, 35 µm, and 40 µm. In Calculation Example S12, the core pitch is 25 µm, in Calculation Example S13, the core pitch is 30 µm, in Calculation Example S14, the core pitch is 35 µm, and in Calculation Example S15, the core pitch is 40 µm.

In Calculation Example S12, the minimum cladding thickness is 17.5 µm, the crosstalk between cores is −43.5 dB/km, and the cladding diameter is 135.0 µm. In Calculation Example S13, the minimum cladding thickness is 17.8 µm, the crosstalk between cores is −74.7 dB/km, and the cladding diameter is 155.6 µm. In Calculation Example S14, the minimum cladding thickness is 18.8 µm, the crosstalk between cores is −105.6 dB/km, and the cladding diameter is 177.6 µm. In Calculation Example S15, the minimum cladding thickness is 18.3 µm, the crosstalk between cores is −132.5 dB/km, and the cladding diameter is 196.6 µm. Accordingly, in Calculation Examples S12 to S15, all of the crosstalks between cores are −30 dB/km or less.

As described above, among the simulation results listed in Table 1, the simulation results for Calculation Examples S5 to S15 are for when the mode field diameter at the wavelength of 1100 nm is 5.0 µm or larger, single-mode propagation is possible at the wavelength of 1100 nm, and the bending loss at the wavelength of 1100 nm in bending at a radius of 2 mm is 1 dB/turn or less. These simulation results for Calculation Examples S5 to S15 indicate that the multi-core fiber 1 having the W-type refractive index profile as illustrated in FIG. 3 has desired characteristics when, for the refractive index profile of the cores 2, the relative refractive-index difference Δ1 of the first core 21, relative to the cladding 3, is 0.60% or more and the relative refractive-index difference Δ2 of the second core 22, relative to the cladding 3, is −0.01% or less.

Furthermore, the lower limit value of the mode field diameter is set in consideration of connection loss, and is set to a value enabling loss to be reduced, the loss being upon connection to a light source. This lower limit may be, for example, 5.0 µm mentioned above. The multi-core fiber 1 is able to be connected to a semiconductor laser element, and, for example, is able to be connected to a light source formed of a vertical cavity surface emitting laser (VCSEL).

Furthermore, there is a demand for the multi-core fiber 1 made of silica-based glass to enable flexible wiring and compact storage of the multi-core fiber 1. In addition, for use in a device, there is a demand for prevention of bending loss even when the multi-core fiber 1 is bent at a very small curvature radius in wiring. In actual optical wiring in a device, the multi-core fiber 1 that has been wired may ultimately be bent at several positions at a curvature radius of about 2 mm. In a case where the multi-core fiber 1 is locally bent when being laid during wiring or in a case where an acceptable value of bending loss required in terms of a worst-case design is considered, sufficiently favorable bending loss characteristics are achieved and flexible optical wiring is enabled if the bending loss is 1 dB or less in bending of one turn at a curvature radius of 2 mm. "Turns" are used to count portions that have been bent (bent portions), and one turn is counted when the multi-core fiber 1 has been bent by 360 degrees. For example, a case with four portions that have been bent by 90 degrees each can be expressed as one turn, and a case with two portions that have been bent by 90 degrees each can be expressed as a half turn.

As described above, by single-mode propagation of light having the wavelength of 1100 nm, the multi-core fiber 1 enables low-loss high-speed optical transmission at a wavelength of 1100 nm to 1200 nm. The mode field diameter at the wavelength of 1100 nm being 5.0 µm or more enables loss upon connection to a light source to be reduced. Furthermore, the bending loss being 1 dB/turn or less at the wavelength of 1100 nm in bending at a curvature radius of 2 mm enables flexible wiring and compact storage of the multi-core fiber 1.

Cross-sectional areas of sections perpendicular to a longitudinal direction are compared to each other, the sections being those of: the multi-core fiber 1 to which Calculation Examples S12 to S15 were applied; and a fiber ribbon including nineteen single-core fibers.

Figure 4:
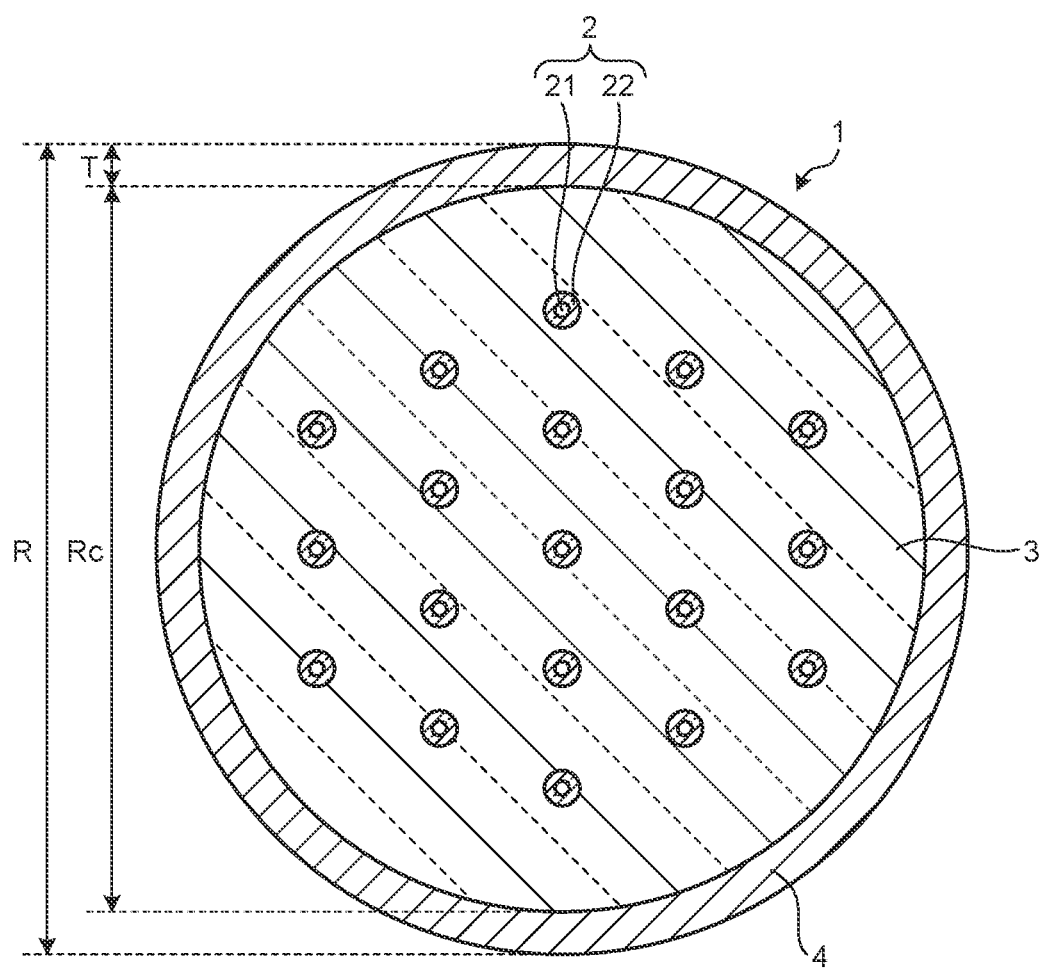
FIG. 4 is a diagram illustrating sizes of parts in the multi-core fiber.

FIG. 4 is a diagram illustrating sizes of parts of the multi-core fiber 1. The cladding diameter of the cladding 3 is Rc and a core wire diameter is R, the core wire diameter being the outer diameter of the multi-core fiber 1. In addition, the thickness of the coating 4 is T.

Figure 5:
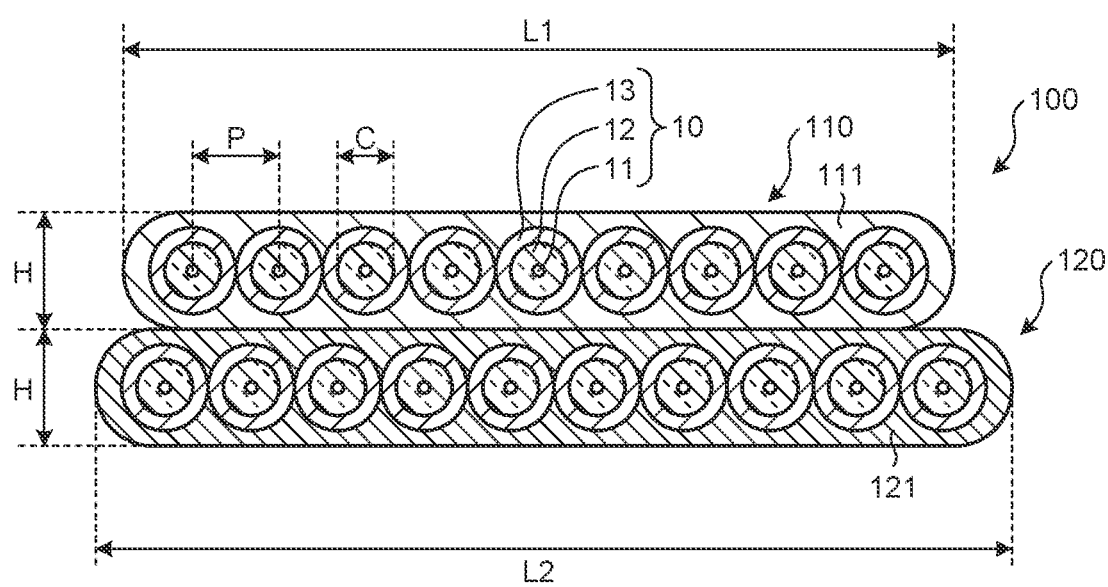
FIG. 5 is a diagram illustrating sizes of parts in a fiber ribbon including nineteen single-core fibers.

FIG. 5 is a diagram illustrating sizes of parts of a fiber ribbon 100 including nineteen single-core fibers 10. Each single-core fiber 10 includes a core 11, a cladding 12, and coating 13. Nine of the nineteen single-core fibers 10 form a nine-core unit fiber ribbon 110 by being juxtaposed adjacently to each other and being collectively covered by ribbon coating 111. Ten of the nineteen single-core fibers 10 forms a ten-core unit fiber ribbon 120 by being juxtaposed adjacently to each other and being collectively covered by ribbon coating 121. The fiber ribbon 100 is formed of the unit fiber ribbon 110 and the unit fiber ribbon 120 layered over each other. Each single-core fiber 10 has a cladding diameter of C. The unit fiber ribbons 110 and 120 each have a core pitch of P. A length of the unit fiber ribbon 110 along a direction in which the single-core fibers 10 are arrayed is L1. A length of the unit fiber ribbon 120 along the direction in which the single-core fibers 10 are arrayed is L2. A height of the unit fiber ribbon 110 and a height of the unit fiber ribbon 120, in a direction orthogonal to the direction along which the single-core fibers 10 are arrayed are both H.

A cross-sectional area of the fiber ribbon 100 was calculated to be about 0.49 mm$^2$ when the cladding diameter C was decreased to 80 µm, the pitch P was 125 µm, and the height H was 170 µm. The length L1 is 125 [µm]×9+25 [µm]×2=1375 µm. The length L2 is 125 [µm]×10+25 [µm]× 2=1500 µm.

For the multi-core fiber 1, calculation was performed with the thickness T being about 90 µm. As a result, cross-sectional areas of the multi-core fiber 1 (MCF core wire cross-sectional areas) were calculated to be those listed in Table 2, for different values of Rc and R.

TABLE 2

| | Rc [µm] | R [µm] | MCF core wire area [mm$^2$] |
|---|---|---|---|
| Calculation Example S21 | 135 | 310 | 0.08 |
| Calculation Example S22 | 155.6 | 340 | 0.09 |
| Calculation Example S23 | 166.6 | 350 | 0.10 |
| Calculation Example S24 | 196.6 | 380 | 0.11 |

That is, in Calculation Example S21, when the cladding diameter Rc was 135 µm like in Calculation Example S12 and the core wire diameter was 310 µm, the MCF core wire area was about 0.08 mm$^2$ that was about 15% of the cross-sectional area of the fiber ribbon 100. Furthermore, in Calculation Example S22, when the cladding diameter Rc was 155.6 µm like in Calculation Example S13 and the core wire diameter was 340 μm, the MCF core wire area was about 0.09 mm² that was about 19% of the cross-sectional area of the fiber ribbon 100. In Calculation Example S23, when the cladding diameter Rc was 177.6 μm like in Calculation Example S14 and the core wire diameter was 350 μm, the MCF core wire area was about 0.10 mm² that was about 20% of the cross-sectional area of the fiber ribbon 100. In Calculation Example S24, when the cladding diameter Rc was 196.6 μm like in Calculation Example S15 and the core wire diameter was 380 μm, the MCF core wire area was about 0.11 mm² that was about 23% of the cross-sectional area of the fiber ribbon 100.

In all of Calculation Examples S21 to S24, the cross-sectional area of the multi-core fiber 1 was able to be made significantly smaller than the cross-sectional area of the fiber ribbon 100 using the small-diameter single-core fibers 10, and multi-core fiber wires like the multi-core fiber 1 were confirmed to be very effective for saving space.

The multi-core fiber 1 described above is not limited to the structure having the nineteen cores 2, and may be formed in a structure having twelve or more cores, or in a structure having sixteen or more cores. For example, a structure formed of a total of twelve cores excluding seven of the plural cores 2 arranged in the hexagonal close-packed structure illustrated in FIG. 1 may be adopted, the seven cores 2 being arranged at positions near the outer periphery of the cladding 3. What is more, the plural cores 2 are not necessarily arranged in the hexagonal close-packed structure, and may be arranged in a predetermined lattice-like structure.

Furthermore, although the W-type refractive index profile is illustrated as an example for the above described embodiment, the refractive index profile is not necessarily of the W-type. For example, other refractive index profiles, such as a step-type refractive index profile, a trench-type refractive index profile, a segment-core-type refractive index profile, and a W-and-side-core-type refractive index profile, may also be adopted.

Furthermore, the refractive indices of the plural cores 2 may be not the same. That is, neighboring ones of the cores 2 may have different refractive indices. In consideration of such a case where the cores 2 have different refractive indices, the cladding 3 is configured to have a refractive index lower than the maximum refractive index of the plural cores 2.

Furthermore, the refractive index of the coating 4 is not necessarily higher than the refractive index of the cladding 3, and may be equal to or less than the refractive index of the cladding 3. That is, the coating 4 may be formed of a resin having a refractive index lower than the refractive index of the cladding 3.

Since Japanese Laid-open Patent Publication No. 2008-58662 describes the single-core configuration, only core designing is mainly performed to satisfy desired optical characteristics, and the core is arranged at the center of the cladding. In contrast, design parameters of multi-core fibers are optimized in terms of optical characteristics and mechanical characteristics, the design parameters including, not only the core designs, but also the numbers of cores, the core arrangements, the minimum cladding thicknesses, and the cladding diameters. Furthermore, characteristics desired for multi-core fibers differ depending on purposes, and fiber designs desired thus also differ depending on the purposes. Fiber designing for multi-core fibers is more complicated because multi-core fibers have more design parameters than single-core fibers. There is thus a demand, as a desired purpose, for a multi-core fiber that enables single-mode propagation at the wavelength of 1100 nm and has, for example, sixteen or more cores.

Forming optical fibers reduced in diameter into a ribbon saves more space than forming fibers having a conventional diameter into a ribbon, but can never be said to be sufficient to meet the increasing demands for higher densities and space saving.

The embodiment described above have an effect of being able to provide a multi-core fiber enabling single-mode propagation at the wavelength of 1100 nm, the multi-core fiber having plural cores. Furthermore, by forming the multi-core fiber into a core wire, space for wiring is able to be saved even more.

The present application is not limited by the above described embodiment. Those configured by combination of the components described above as appropriate are also included in the present application.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multi-core fiber, comprising:
   at least twelve cores made of silica-based glass; and
   a cladding enclosing the at least twelve cores and made of silica-based glass, the cladding having a refractive index lower than a maximum refractive index of the at least twelve cores, wherein:
   the multi-core fiber has a mode field diameter of 5.0 μm or larger at a wavelength of 1100 nm,
   the multi-core fiber provides single-mode propagation at the wavelength of 1100 nm,
   the multi-core fiber has a bending loss of 1 dB/turn or less at the wavelength of 1100 nm when the multi-core fiber is bent at a radius of 2 mm,
   the multi-core fiber has a crosstalk between cores of −30 dB/km or less t the wavelength of 1100 nm, and
   the cladding has an outer diameter of 196.8 μm or less.

2. The multi-core fiber according to claim 1, wherein the cladding has an outer diameter of 124 μm to 126 μm.

3. The multi-core fiber according to claim 2, further comprising:
   a coating that covers an outer periphery of the cladding and is made of a resin having a refractive index lower than the refractive index of the cladding.

4. The multi-core fiber according to claim 3, wherein a minimum cladding thickness is 8.5 μm or more, the minimum cladding thickness being a parameter expressed by a minimum distance from a center of one of the cores positioned outermost among the at least twelve cores to an interface between the cladding and the coating.

5. The multi-core fiber according to claim 4, wherein each of the at least twelve cores includes:
   a first core; and
   a second core surrounding an outer periphery of the first core,
   the cladding surrounds an outer periphery of the second core,
   a relative refractive-index difference of the first core, relative to the cladding, is 0.60% or more, and
   a relative refractive-index difference of the second core, relative to the cladding, is −0.01% or less.

6. The multi-core fiber according to claim 1, further comprising:
   a coating that covers an outer periphery of the cladding and is made of a resin having a refractive index lower than the refractive index of the cladding.

7. The multi-core fiber according to claim 6, wherein a minimum cladding thickness is 8.5 μm or more, the minimum cladding thickness being a parameter expressed by a minimum distance from a center of one of the cores positioned outermost among the at least twelve cores to an interface between the cladding and the coating.

8. The multi-core fiber according to claim 7, wherein
   each of the at least twelve cores includes:
      a first core; and
      a second core surrounding an outer periphery of the first core,
   the cladding surrounds an outer periphery of the second core,
   a relative refractive-index difference of the first core, relative to the cladding, is 0.60% or more, and
   a relative refractive-index difference of the second core, relative to the cladding, is −0.01% or less.

9. The multi-core fiber according to claim 1, wherein the cladding has an outer diameter of 117.1 μm or more.

\* \* \* \* \*